Feb. 5, 1924.
C. C. HANSEN
APPARATUS FOR CHANNELING ROCK
Filed July 23, 1920
1,482,396
3 Sheets-Sheet 1
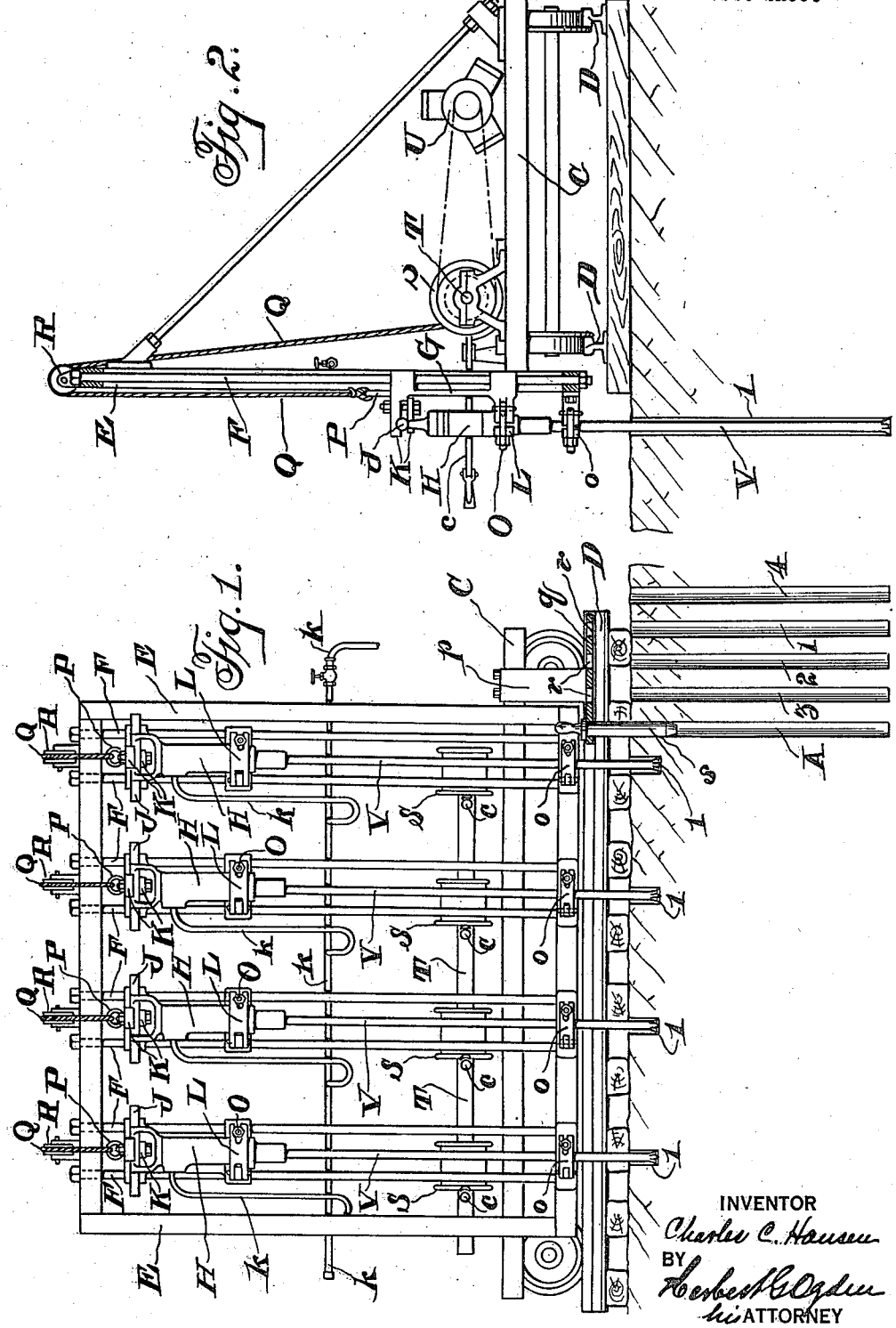
INVENTOR
Charles C. Hansen
BY
Herbert G. Ogden
his ATTORNEY Feb. 5, 1924.
C. C. HANSEN
APPARATUS FOR CHANNELING ROCK
Filed July 23, 1920   3 Sheets-Sheet 2
1,482,396
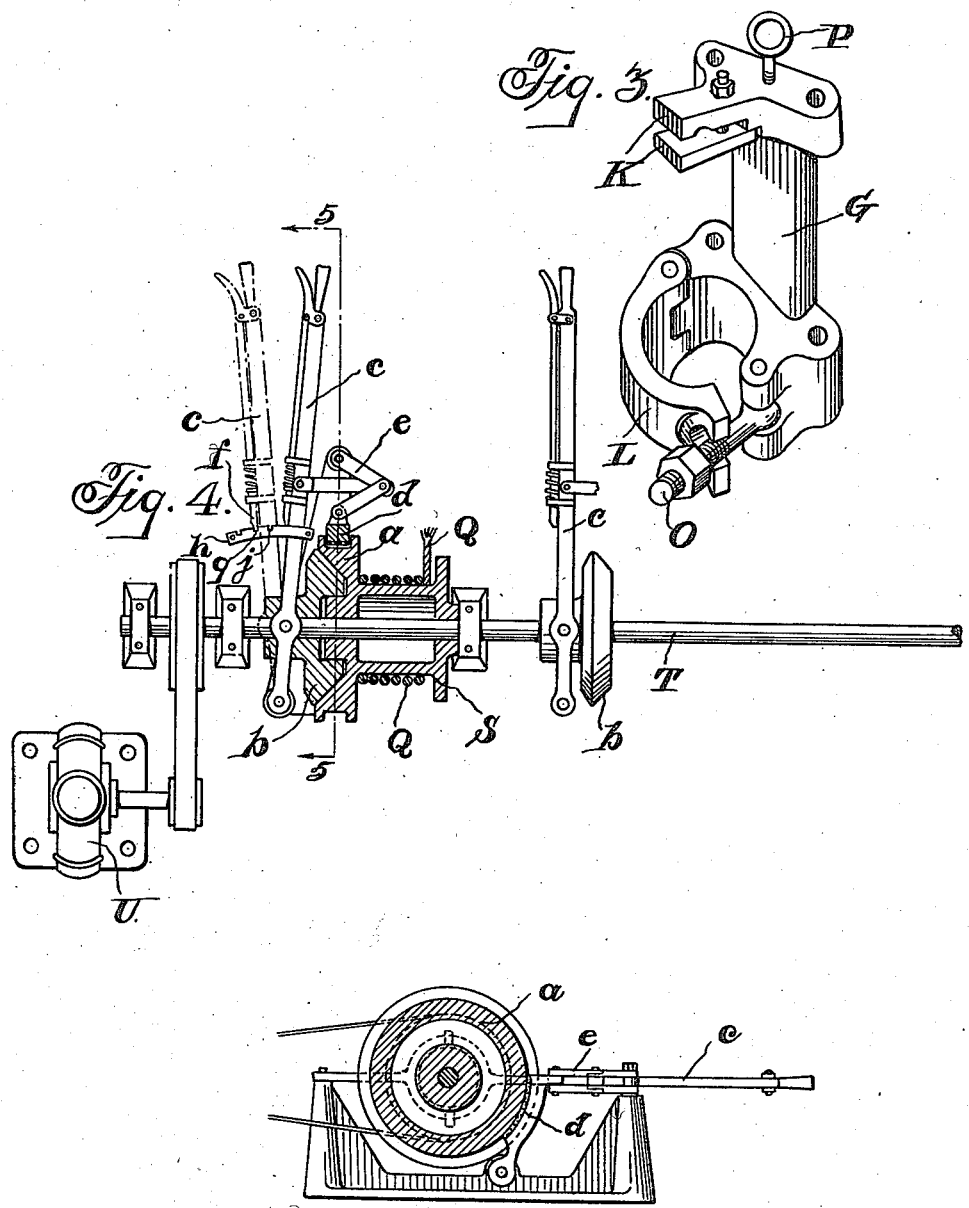
INVENTOR
Charles C. Hansen
BY
Herbert G. Ogden
his ATTORNEY Patented Feb. 5, 1924.

1,482,396

UNITED STATES PATENT OFFICE.

CHARLES C. HANSEN, OF EASTON, PENNSYLVANIA, ASSIGNOR TO INGERSOLL-RAND COMPANY, OF NEW YORK, N. Y., A CORPORATION OF NEW JERSEY.

APPARATUS FOR CHANNELING ROCK.

Application filed July 23, 1920. Serial No. 398,374.

*To all whom it may concern:*

Be it known that I, CHARLES C. HANSEN, a citizen of the United States, residing at Easton, in the county of Northampton and State of Pennsylvania, have invented certain new and useful Improvements in the Apparatus for Channeling Rock, of which the following is a specification.

This invention relates to apparatus for channeling rock, more especially for use in quarries for cutting blocks or dimension stones and for use wherever it is desired to cut channels in the rock such as canal work, building foundations and work of similar character.

Channeling has heretofore been a continuous operation, by running the channeling machine forward and back over the line of work to be cut and delivering the blows of the channeling machine through the steels upon the rock. The process is necessarily slow and requires substantially great skill of the operator. Furthermore the heavy blows delivered on the steels by the channeling machine often bruises or fractures the stones for a considerable distance from the cut and this bruised or fractured material is useless so that the blocks must be planed entailing considerable waste.

The primary objects of the present invention are to simplify the methods and apparatus for channeling, enable the machine to be operated and the channel cut by an operator not possessing any special skill, and avoid bruising and fracturing the stones.

Instead of cutting a continuous channel as heretofore, my invention consists in first simultaneously drilling a series of equidistantly relatively widely spaced holes by means of drilling machines along the line of the desired channel, then simultaneously drilling another series of holes on the same line close to the holes in the first series, and continuing to progressively drill series of holes in the same manner on the line of the channel until the spaces between the holes in the first series are filled with substantially equidistantly relatively closely spaced holes. Having produced the required number of substantially closely spaced holes I then broach the solid portion of the rock between the holes to form a continuous channel. The broaching operation is substantially a repetition of the drilling operation, with broaching bits substituted for drilling bits in the drilling machines.

For carrying out this cycle of operations, the apparatus may conveniently consist of a traveling carriage having an upright frame with a plurality of rock drills preferably of the hammer type, mounted for vertical movement on said frame and adapted to be held to the work by the weight of the slidable mounting. Power driven means are preferably provided for lifting each one of the rock drills to its upper starting position and controlling means are provided for the lifting means so that series of spaced holes in progression may be simultaneously driven along a given line by means of the rock drills. Means are also preferably provided for accurately spacing the travel of the rock drill carriage along the line of a channel.

In accordance with my invention faster channeling may be effected and consequently at less cost than heretofore. The conditions of the quarry will have less effect on this system as the track work will not have to be so carefully adjusted as with the old method, and the stone will be less bruised than is the case where a continuous slot is channeled, because with my method and machine the drill steels are struck much lighter blows with larger penetration of the bit.

Suitable apparatus for carrying out the operations are illustrated in the accompanying drawings, in which—

Figure 1 is a side elevation of a traveling carriage and rock drills mounted thereon for carrying out the herein described invention, Figure 2 is an end elevation of the same, Figure 3 is an enlarged detail perspective view of a suitable clamp or mounting for the rock drills, Figure 4 is an enlarged detail plan view partly in horizontal section of the power actuated means for lifting and lowering the rock drills in the frame.

Figure 5 is a transverse sectional elevation of Figure 4 on the line 5—5 looking in the direction of the arrows.

Figure 6:
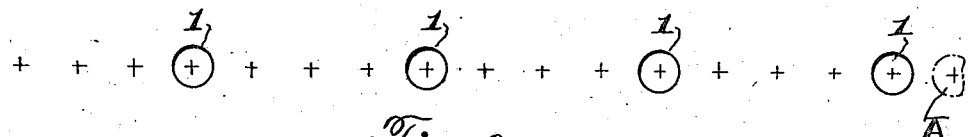
Figures 6, 7, 8, and 9 are diagrammatic plan views indicating the progressive steps in drilling the holes in accordance with my invention.

Referring to the drawings and at first more particularly to Figures 6 to 11 inclusive, which illustrate the operation, let it be assumed that one series of holes has already been completed along the line of the channel, the last hole of that series being indicated at A in the figures.

In starting a cut, a series of holes 1 are first simultaneously drilled at equal distances apart along the line of the channel. The distance between the holes 1 corresponds to the distance between the rock drills on the carriage, regardless of the number of drills. In this instance the cycle of operations is shown carried out with four rock drills shown in Figure 1, but it is to be understood that any desired number may be used, and the capacity of an operator should be ten or more of these machines on a frame.

Figure 7:
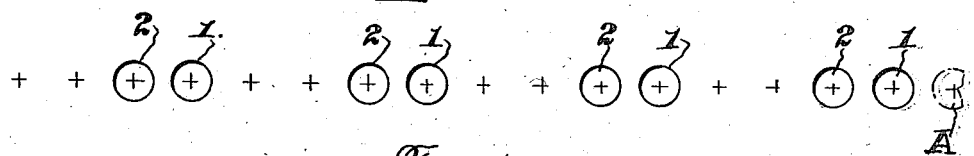
Figure 8:
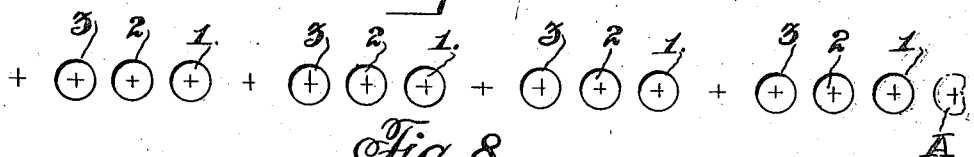
Figure 9:
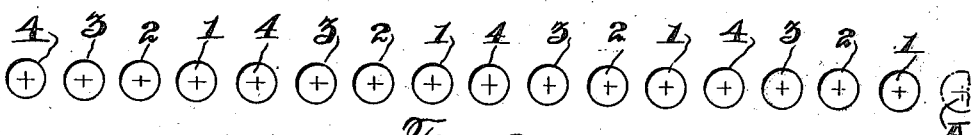

After the first holes 1 have been drilled, as shown in Figure 6, the drilling machine carriage is moved forward along the line of the cut the desired distance, and the series of holes 2 are simultaneously drilled, as shown in Figure 7, preferably close to the holes 1. The carriage is then moved forward again and the holes 3 are drilled, as shown in Figure 8. Lastly the holes 4 are drilled which completes the line of holes taken as an illustration of the method, as indicated in Figure 9, it being understood that the same method would be carried out with any desired number of drills.

Figure 10:
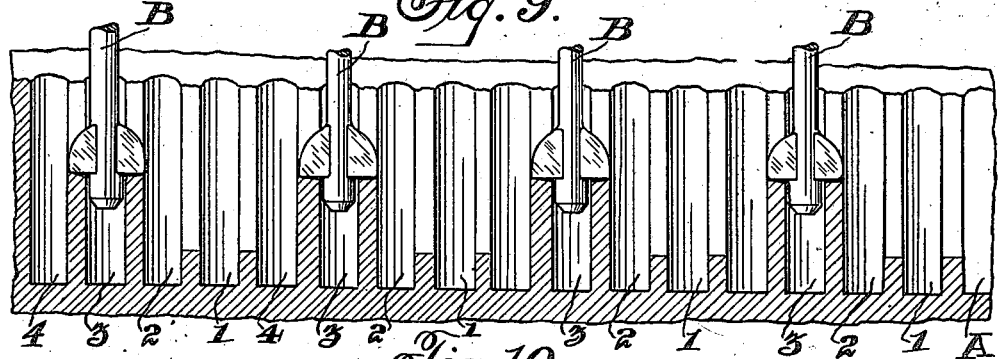
Figure 10 is a vertical sectional view taken through a series of holes illustrating the method of broaching the rock between the holes.
Figure 11:
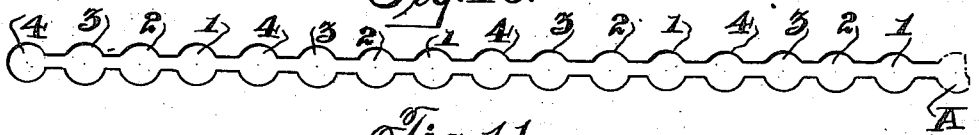
Figure 11 illustrates the completed channel after broaching.

In order to complete the cut, the drill steels are replaced by broaches B as shown in Figure 10 and the rock walls between the holes are broached to form the channel indicated in Figure 11. The broaching is carried out progressively in substantially the same manner as the drilling, that is, four broaches are simultaneously operated, or as many as there are machines on the traveling carriage.

Suitable apparatus for carrying out this cycle of operations is illustrated in Figures 1 to 5 inclusive showing one preferred form, also it is to be understood that other forms of apparatus may be devised for carrying out the cycle of operations and I am not to be understood as limiting the invention to the apparatus shown.

The carriage C travels on the track D and is provided with the upright frame E preferably having vertical guide rods F on which the clamps G slide independently of each other. Rock drills, preferably of the hammer type H, are suitably mounted in the clamps or mountings G, in this instance the handles J being held upon clamping members K, while the drill cylinders are adapted to be held by the hinged clamping jaw L provided with locking means in the form of a bolt O. The clamps or mountings G are provided with the ring bolts P connected to the ropes Q running over the pulleys R and over the winding drums S on the shaft T operatively connected to be driven by a suitable motor U so that the drilling machines may be lifted to the top of the frame for starting, the weight of the machine and mounting being sufficiently heavy to hold the drill steel to its work. The rock drills are provided, as shown in Figure 1, with the usual drill steels V for drilling the series of holes and each rock drill is fed to its work independently of all the others.

Suitable controlling means are provided for controlling the winding drums S, in this instance each drum being provided with a clutch member $a$ cooperating with a clutch member $b$ rotatable therewith but longitudinally slidable on the driving shaft T as by means of the lever $c$. Each clutch member $a$ is provided with a brake $d$ connected to toggle levers $e$ operatively connected to be controlled by the controlling levers $c$ so that when the lever $c$ is moved toward its drum S in the position indicated in full lines in Figure 4, the brake $d$ is released, the clutch is thrown into operative position and the drum S will wind up the rope Q to lift that particular rock drill. When the controlling lever $c$ is moved into position as indicated in dotted lines in Figure 4 with the detent $f$ in the notch $g$ in the quadrant $h$ the clutch will be released and the brake will be thrown on to hold the drilling machine in raised position. The controlling lever $c$ is in neutral position with the brake and clutch released when the detent $f$ is in the notch $j$ in which position the rock drilling machines are in operation and feed downward to their work. All the levers $c$ are located at the front of the frame where they are easily accessible and each of the winding drums is adapted to be controlled independently of the others. Any suitable hose line connection $k$ is provided for supplying motive fluid as compressed air under pressure to the rock drills. The lower portion of the carriage frame is preferably provided with a series of clamps $o$ for guiding the drill steels in the operation of drilling.

One end of the carriage as shown, is provided with a bracket $p$ suitably secured thereto and having a horizontal plate $q$ provided with a plurality of separate-spaced apertures $r$, through one of which a spacing plug $s$ is adapted to be inserted for spacing the series of holes. In Figure 1 the spacing plug $s$ is shown in the hole A previously drilled in the rock, for giving the proper spacing for the first series of holes 1 for the new cut. After the holes 1 have been drilled and the rock drills raised to the top of the frame, the spacing plug s is removed and inserted in the first hole 1 as the machine carriage is moved forward the required distance. The machine is then ready to drill the series of holes 2 and so on throughout the cycle of operations. By means of the spacing bracket p and the plurality of holes r in the plate q, any desired spacing between the series of holes in the rock may be provided. The spacing device is conveniently located at the front of the frame in proximity to the controlling levers c, clamps o and hose line connection k. This arrangement tends to simplify and improve the operation of the device. It is to be understood that the broaching operation indicated in Figure 10 may be carried out after a given series of holes in the rock have been drilled, or the broaching operation may await the completion of a long series of drilled holes, several hundred feet long, or as long as desired.

I claim:

1. In a machine for channeling rock, the combination of a traveling carriage, having an upright frame provided with pairs of vertical guide rods, mountings independently slidable on said guide rods, adjustable clamping members on said mountings for holding the cylinder casings of rock drills of the hammer type, a power driven shaft having winding drums loosely mounted thereon, rope feed connections between the rock drills and the winding drums, independently operable clutch members for connecting the winding drums respectively to the driven shaft, manual clutch levers for each clutch extending forwardly to the front of the machine between the pairs of vertical guide rods, and brakes for the drums also connected to be operated by said clutch levers for holding the drums or permitting downward feeding of the rock drill mountings.

2. In a machine for channeling rock, the combination of a traveling carriage having an upright frame provided with pairs of vertical guide rods, mountings independently slidable on said guide rods, adjustable clamping members on said mountings for holding the handles and cylinders of rock drills of the hammer type, a power driven shaft having winding drums loosely mounted thereon, rope feed connections between the rock drills and the winding drums, independently operable clutch members for connecting the winding drums respectively to the driven shaft, manual clutch levers for each clutch extending forwardly to the front of the machine between the pairs of vertical guide rods, brakes for the drums also connected to be operated by said clutch levers for holding the drums or permitting downward feeding of the rock drill mountings, a spacing bracket on the carriage and a spacing plug cooperating with said bracket for spacing the movement of the carriage.

In testimony whereof I have signed this specification.

CHARLES C. HANSEN.